United States Patent [19]

Haines et al.

[11] Patent Number: 4,615,807

[45] Date of Patent: Oct. 7, 1986

[54] METHOD FOR WASTEWATER TREATMENT

[75] Inventors: Frederick T. Haines, Boca Raton; David Forte, Plantation, both of Fla.

[73] Assignee: United States Environmental Resources, Corp., Port Everglades, Fla.

[21] Appl. No.: 757,971

[22] Filed: Jul. 23, 1985

[51] Int. Cl.$^4$ .............................. C02F 1/24; C02F 1/50
[52] U.S. Cl. .................................... 210/704; 210/764; 210/776
[58] Field of Search ............... 210/608, 620, 621–629, 210/631, 764, 703–707, 776

[56] References Cited

U.S. PATENT DOCUMENTS 2,692,231 10/1954 Stayner et al. ...................... 210/764
3,231,509 1/1966 Shema .................................. 210/764
3,256,143 6/1966 Zedler ................................. 210/764
3,801,499 4/1974 Luck ................................... 210/764
3,915,853 10/1975 Luck ................................... 210/764

FOREIGN PATENT DOCUMENTS 72426 2/1983 European Pat. Off. ............ 210/764

Primary Examiner—Benoit Castel
Attorney, Agent, or Firm—Darby & Darby

[57] ABSTRACT

Disclosed is a method for treating sewage wastewater comprising in lieu of activated sludge treatment mixing into wastewater a bactericidally effective and disinfectant amount of a formulation comprising compounds selected from the group consisting of quaternary organic ammonium halides or mixtures thereof and an organo-tin disinfectant compound. A plant employing the above method is also disclosed.

12 Claims, 2 Drawing Figures

METHOD FOR WASTEWATER TREATMENT

The present invention relates generally to a method for safe and efficient treatment of sewage and other domestic wastewater. More particularly, the present invention relates to a chemical treatment of wastewater as an alternative to biotreatment.

Most ordinary wastewater is composed of about 99.9% water and about 0.1% solid waste. The most widely used conventional method for treating wastewater is the Activated Sludge Process or one of its derivatives, such as the Extended Aeration or Contact Stabilization Method. These processes involve sedimentation of the solid wastes and aerobic biological decomposition of the remaining organic matter. The objective is to oxidize and stabilize the wastewater by removing the oxygen-consuming organic matter.

In the Extended Aeration Method for example, the wastewater is passed through several sequential tanks for purification. They include a Sludge/Aerating Zone, a Settling Zone, a Chlorine Contacting Zone, and an Aerated Sludge Digesting Zone.

In the Sludge/Aerating Zone, the wastewater is aerated and mixed with activated sludge returning from the Settling Zone. The activated sludge provides a source of aerobic microorganisms that utilize the oxygen dissolved in the wastewater to digest the organic material in the wastewater. This mixture of wastewater, oxygen, and activated sludge (known as "mixed liquor") must remain in the tank for about 24 hours to allow the bacteria to digest the biodegradable solids. Aeration provides sufficient oxygen to support bacterial life in this tank.

Aeration is also required to meet the biochemical oxygen demand (BOD) of the effluent. BOD is defined as a quantitative measure of the amount of oxygen used by a sample of wastewater during a 5-day incubation period at 20° C. Compounds that contribute to the oxygen demand include raw or treated sewage, oxidizable nitrogen from nitrites, ammonia, organic nitrogen compounds, and certain chemical and reducing compounds such as ferrous ions and sulfite ions. When polluted water is not saturated with oxygen, anaerobic bacteria produce substantial amounts of noxious gases such as hydrogen sulfide and methane, known as swamp gas. If accumulated, these gases are highly flammable and explosive.

From the Sludge/Aerating Zone, the mixed liquor is conducted into the Settling Zone where it remains for several (usually about 4) hours. The heavy activated sludge solids, which settle, and the floating debris contained in the wastewater are separated off. At least a portion of the activated sludge so collected is returned to the Aeration Zone to replenish the supply of aerobic bacteria for digesting raw wastewater newly accumulated in the Aeration Zone. The effluent is chanelled through filters to a Chlorine Contacting Tank, where it is contacted with chlorine for a minimum of 15 minutes for disinfection. The disinfected effluent is then transported to an Evaporating and Percolating Pond or Absorption Field or Spray Field, from where it is returned to the environment.

When the solid contents of the mixed liquor build up to a point where they would interfere with normal operation of the Aerating and Settling Tanks, the aerated sludge is conveyed from the aerating tank to the Digesting Tank in which the solids are trapped and aerated until stable. The solids are then dispensed to sludge drying beds or are hauled to special land fills.

The conventional wastewater sewage processes, described above, have a number of major drawbacks, discussed below.

(A) Substantial Capital Investment

The wastewater to be digested and aerated must remain in the Aerating Tank for a total of 24 hours. Thus, a large, expensive tank able to hold the wastewater of at least one 24-hour output period is needed. For a 50,000 gallon/day activated sludge, an aeration tank with at least a 50,000 gallon capacity is necessary. Moreover, due to difficulties in process monitoring and control (see below) excess tank capacity and/or additional tanks are usually required. These high-capacity plants require a substantial capital investment in land, construction and equipment.

(B) Operating Costs

1. Conventional Activated Sludge plants require a large inventory in spare parts since some mechanical failures can lead to a shutdown of the entire plant. For example, a breakdown in the aeration process will cause the sludge to bulk or to rise to the surface and creates an environmental pollution hazard. The treatment process has to be stopped and the contaminated effluent captured and cleared.

A mechanical failure (causing inadequate oxygenation for example) can kill the aerobic bacteria. This necessitates suspension of all operations until the bacterial level in the Aerating Tank can be restored.

2. Activated sludge plants use many mechanical parts. They include air blowers, motors, scraper and clarifier drive units, pumps, sludge dewatering equipment and facilities, and chemical feeders. These mechanical parts need frequent repair or replacement, and operate on electricity, thus adding to the operating costs.

3. Operation of these plants requires careful monitoring and highly accurate process control. Water quality must be constantly monitored to ensure complete disinfection. Other parameters that must be controlled include pH, solids content, sludge age, bacteria levels, oxygen and chlorine levels, and effluent flowthrough. Laboratory tests must be conducted daily and sometimes hourly. This results in high labor costs, as it requires a highly trained operating staff.

(C) Environmental Hazards

1. These plants use chlorine to disinfect the final effluent. Chlorine gas is highly toxic and special equipment is required for dispensing it. Safety equipment and skilled personnel must always be kept on hand in case of a chlorine leak, and liability for damages always remains a possibility.

2. The activated sludge must be carefully monitored to prevent it from bulking or rising to the surface. If there should be a failure in the system that causes bulking (either because the solid contents are too high or too low, or because aeration is too high or too low), then the bulking sludge will go over the weir of the Settling Tank and contaminate the entire Holding Pond or discharge stream. A septic or an under-aerated sludge can give off offensive odors and draw complaints from a large area.

3. The ultimate disposal of excess activated sludge may lead to environmental problems since the sludge is highly putrescible. For disposal, the sludge is generally divided into solid and liquid portions. The solid part is disposed of by burying it in special land fills or in areas requiring soil conditioning. Substantial acreage can be used up for these sludge drying beds, and the possibility of pollution from these land fills remains high. (The liquid portion is returned to the treatment plant for reprocessing. The reprocessing further burdens the plant.)

4. The treated wastewater must often be conveyed to selected sites, because its high chlorine-content (usually 2 ppm) may render it unsuitable for return to the environment. For example, water having a 2 ppm free chlorine content cannot be used for irrigation, because this chlorine level can be detrimental to plant growth.

OBJECTS OF THE INVENTION

Broadly, it is an object of this invention to provide a more economic, efficient and convenient method for the treatment of wastewater. More specifically, it is within the contemplation of this invention to provide a method for rapidly, safely and inexpensively disinfecting wastewater, using a minimum number of tanks and mechanical parts, and a small capacity installation.

It is another object of this invention to provide a wastewater treatment method wherein the installation requires less land acreage, compared to activated sludge treatment plants.

It is a further object of this invention to provide a process for treating sewage wastewater than can be practiced in a plant capable of being readily expanded at a later time at a relatively low cost.

It is another object of this invention to provide a method that does not use activated sludge for wastewater treatment, thus eliminating foul odor and special treatment, monitoring, and process control steps associated with the use of activated sludge.

It is another object of this invention to provide a process that can be carried out in a simply designed plant having minimum maintenance costs and using personnel requiring minimum training.

It is yet another object of this invention to provide a process for treating wastewater wherein the products can be returned to the environment after treatment without or with little further treatment.

In accordance with the present invention, raw domestic sewage is first passed through a conventional screen to retain most of the solids (debris associated with sewage). It is then contacted with a bactericidal/disinfectant formulation comprising a mixture of alkyl methyl benzyl ammonium halides and an organotin compound in an amount sufficient to sterilize the waster water without posing disposal problems. Mixing is preferably effected by aeration, which also lowers or satisfies the wastewater BOD. The disinfected wastewater is then further cleared by skimming, floating and settling solids, filtered and returned to the environment.

The method of the present invention can be carried out in a wastewater treatment plant for the chemical treatment of wastewater consisting essentially of:

solid collecting means for screening and removing the bulk of solids present in said wastewater;

delivery means for delivering to said wastewater a disinfectant composition comprising a bactericidally effective amount of a duo-quat formulation and an algaecidally effective amount of an organo-tin compound;

a surge/aeration zone for mixing said wastewater with said composition and for lowering or satisfying its biochemical oxygen demand;

a settling zone for settling the settlable solids and floating the floatable debris remaining in said disinfected wastewater, said zone comprising settled solid and floating debris removal means;

filter means for clarifying the effluent from the settling zone from where said clarified effluent can be disposed;

filter-cleaning means for backwashing said filter means with said effluent fluid; and means for delivering said backwash fluid to said aeration tank.

The foregoing brief description, as well as further objects, features and advantages of the present invention will be more completely understood from the following detailed description of the presently preferred, but nonetheless illustrative embodiment of the invention, with reference being had to the accompanying drawings wherein:

DETAILED DESCRIPTION OF THE PRESENT INVENTION

Figure 1:
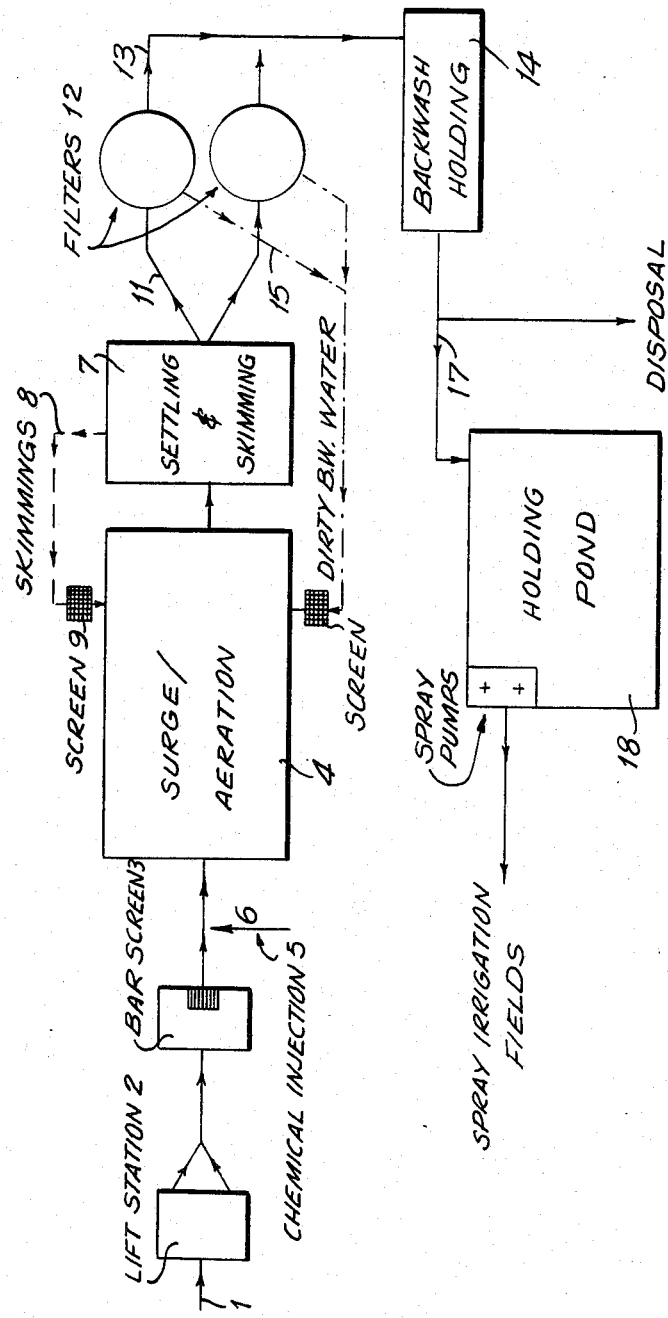
FIG. 1 is a flow diagram of a plant using the process of the present invention.

With specific reference to FIG. 1, domestic sewage 1 is passed through a lift station 2 and then pumped through bar screen 3 into Surge/Aeration Tank 4. Bar screen 3 serves to retain most debris and other solids present in the wastewater.

The disinfectant formulation 5 is introduced at or immediately before the Surge/Aeration Tank in any way that will ensure complete mixing. A preferred way is to meter the formulation into the feed 6 to the Aeration Tank. The formulation can be conveniently dosed from a drum or holding tank using a standard positive displacement pump, which can be either flow-actuated or continuous-flow. In the latter case, the amount of the formulation delivered to the tank would be based on average daily flow.

The disinfectant formulation preferably comprises 97% duo-quat (a mixture of two quaternary ammonium compounds) and 3% organo-tin compound. Most preferably, it contains TBTO, a preparation containing tri-n-butyltin oxide in (distributed by M & T Chemical Co., Newark, New Jersey, and BTC215M, a detergent preparation containing n-alkyl (60% $C_{14}$, 30% $C_{16}$, 5% $C_{12}$ and 5% $C_{18}$) dimethyl benzyl ammonium chorides (distributed by Onyx Chemical, Jersey City, New Jersey). Other suitable preparations include quaternary ammonium compounds selected from the group consisting of:

Cetyl trimethylammonium bromide
Cetyl pyridinium bromide
Cetyl Pyridinium chloride
Tetradecylpyridinium bromide
Alkyldimethylbenzylammonium chloride
B-Phenoxyethyldimethyldodecylammonium bromide
Di(n-octyl)dimethylammonium bromide
p-tert-octylphenoxyethoxyethyldimethylbenzylammonium chloride
N-(acylcolaminoformylmethyl)pyridinium chloride and organo-tin compounds selected from the group consisting of:
Ethyltin trichloride
Diethyltin dichloride
Triethyltin
Trimethyltin acetate
Tri-n-propyltin acetate
Tri-n-butyltin acetate
Tri-n-hexyltin acetate
Triphenyltin acetate
Triethyltin hydroxide
Triethyltin benzoate
Triethyltin acetate
Triethyltin cyanide
Triethyltin phenoxide
Triethyltin toluene-p-sulphonamide The relative composition of the formulation ranges between about 95/5 and 99/1 duo-quat/organo-tin, and preferably, about 97/3 duo-quat/organo-tin. A higher organo-tin proportion is harmless but unnecessary. The duo-quat is used for its excellent disinfectant/bactericidal ability at low (EPA-approved) concentrations. The organo-tin is used to prevent fungus and alga growth, presumably by interfering with enzyme function.

The amount of the formulation should be sufficient to ensure sterilization of the wastewater. It generally ranges between 50 and 100 ppm of wastewater processed. Higher amounts are permissible but usually unnecessary. In addition, too high amounts may limit the manner in which the treated wastewater may be disposed and are undesirable. Therefore, the objective is to use the minimum amount of disinfectant sufficient for waste-water sterilization. This amount is usually about 100 ppm, (97 ppm duo-quat and 3 ppm organo-tin) based on the amount of wastewater present in the aerating tank at any one time during the (continuous) process. Of course, if wastewater is particularly contaminated, a higher amount may be necessary, but this can be determined by ordinary experimentation.

The quats destroy bacteria by cell wall disruption. Only several minutes (15–20) are required for disinfection. The quats have proved effective in killing gram-negative bacteria (e.g. *Escherichia coli*) gram-positive bacteria (e.g. *Staph. aureus*) mycoplasma and certain viruses. Numerous studies by Onyx Chemical Co. have also shown this formulation to be a potent disinfectant. The amount of the formulation used is not harmful to humans, fish or plants.

In the Surge/Aeration Tank 4, the wastewater is thoroughly mixed with the disinfectant by aeration. In addition to mixing, aeration serves to lower the BOD of the wastewater. In fact, by use of the present invention, the wastewater can be completely saturated with oxygen (and convert nitrites to more stable nitrates) in a short period of time (about one order of magnitude shorter than that required in the Activated Sludge process—usually about 2–3 hours for a 30,000 gpd plant). In fact, the actual contact time necessary for disinfection is between about 15 and 30 minutes. The additional time is given to saturate the sewage/chemical mixture with oxygen. Thus, sufficient oxygen can be supplied to the waste-water to oxidize the undesirable nitrites contained therein to the corresponding stable nitrates. Surface aerators are particularly suitable for this purpose. They are simple to maintain, consume less power, and allow a thorough mixing.

From the Surge/Aeration Tank 4, the aerated and stabilized wastewater is led to a Settling/Skimming Tank 7. There, remaining floating and settling debris are skimmed off with standard collecting bottom and surface skimmers (not shown). The collected skimmed floatable material 8 is passed over a screen 9 that retains the debris and allows the liquid portion 10 to return to the Surge/Aerating Tank 4. Settled solids are removed by a standard blow-off valve (not shown).

The effluent liquor 11 from the Settling Tank is passed through one or more filters 12 (preferably sand-/anthracite filters) for further removal of unsettlable solids and clarification. The filters can be standard gravity filters. Long filter runs are made possible by the low solid content, and the absence of sludge overflow; which affects activated sludge processes. The sterile and clear filtrate 13, flows into a backwash holding tank 14. The reason for tank 14 is to retain a reservoir of water for cleaning the sand/anthracite filters 12. Since colloidal particles present in the liquor 11 may eventually clog filter 12, periodic backflushing is required. This is accomplished with effluent from the Backwash Holding Tank. After backflushing, the backwash liquid 15 is returned from the filters 12 to the Surge/Aerating Tank 4 and recycled.

Effluent 17 from the Backwash Holding Tank 14 is stable for up to three weeks. This effluent is ideal for a spray irrigation system since it is pathogen-free and also contains minerals suitable for fertilizing. This effluent contains no chlorine, in contrast to effluent from conventional activated sludge treatment plants, which must contain at least 2.0 ppm of chlorine to assure disinfection. It can be directly disposed of or it can be stored in holding pond 18 and then applied directly to spray irrigation fields, where it has a mild fertilizing action (in contrast to chlorinated water, which at a free-chlorine concentration of about 2.0 ppm inhibits plant growth).

Alternatively, the effluent can be so disposed directly by-passing the need for a holding pond. Other effluent disposal methods include percolation ponds, receiving streams and ocean outfalls.

The invention is further described in the following Examples, which are intended to illustrate the present invention but not to limit its scope.

EXAMPLE 1

Figure 2:
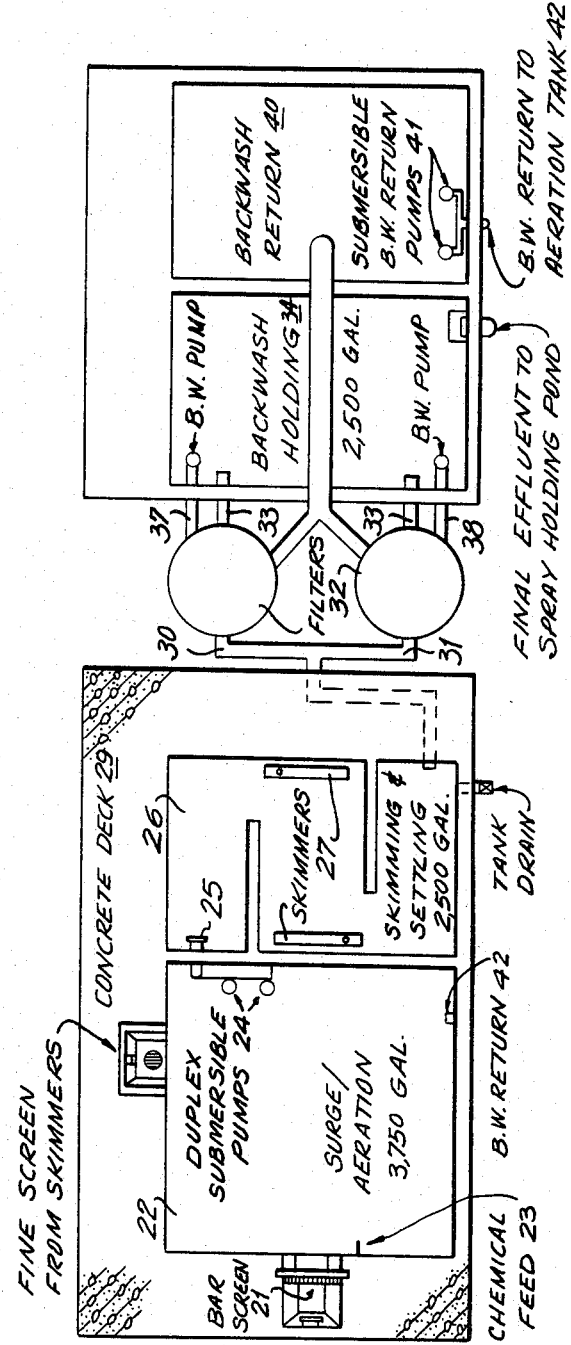
FIG. 2 is a schematic representation of a plant using the process of the present invention in accordance with a preferred embodiment thereof.

FIG. 2 shows a 30,000-gallon/day treatment plant according to the invention. Wastewater sewage is filtered through bar screen 21 into Surge/Aerating Tank 22 having a 501 ft. volume and a capacity of 3,750 gallons. The duo-quat/organo-tin formulation is added through valve 23 at the rate of approximately 100 ppm and mixed with wastewater and air. After three hours, the wastewater is drained with duplex submersible pumps 24 through pipe 25 into Skimming and Settling Tank 26.

The wastewater is allowed to stand in this tank for about two hours after which skimmers 27 remove floating and settled debris and pass them through fine screen 28 where the debris are retained. The liquid portion of the skimmed fraction re-enters tank 22 for recycling. The Skimming and Settling Tank has a volume of 334 cubic feet and a 2,500 gallon capacity. The Surge/Aerating tank and the Skimming and Settling Tank are both surrounded by concrete deck 29.

The effluent from the Settling Tank is then piped througn conduits 30 and 31, through filters 32, and conduits 33 into the Backwash Holding Tank 34. The filters have an area of 9.5 square feet each and allow a flow of 38 gallons per minute (GPM). The Backwash Holding Tank is 334 cubic feet and has a 2,500 gallon capacity. The sterile water is retained in this tank for about 2 hours and can then be drained to a spray holding pond, to an absorption field, or to another suitable facility, such as a receiving stream or an ocean outfall.

Alternatively, the sterile filtrate can be disposed of directly without storage in a holding tank.

Periodic backflushing of filters 32 is required to prevent their total clogging. The filters are backflushed by pumping effluent from the Backwash Holding Tank 34 through condutis 37, 38 and 39 into the Backwash Return Tank 40. This tank is 334 cubic feet and has a capacity of 2,500 gallons. When the backwash return tank is filled, the liquor is returned by submersible pumps 41 through conduit 42 into the Surge/Aerating Tank 22 for recycling.

EXAMPLE 2

Table 1 shows the dimensions of choice for a typical 30,000 gallon capacity treatment plant for a 24-hour period according to this invention. The table also compares the capacity, volume, and retention time, of the tanks in a plant according to this invention with those of a conventional treatment plant capable of treating 30,000 gallons of wastewater sewage over a 24-hour period. It should be noted that the capacity required of the Aerating Tank of the present invention is only 8.3% of that of the Aerating Tank used in the conventional (activated sludge) treatment facility. The Settling Tank of this invention requires a capacity of less than 20% of the equivalent tank for the conventional process. Although the Backwash Holding Tanks of both plants have the same capacity, there are no Chlorine Contacting tanks or Digesting Tanks in the present invention. The capacity of the tanks in the present invention total to 5,700 gallons as compared to 49,700 gallons in the conventional plant, a ratio of about 1:8. This represents significant savings in materials and space.

EXAMPLE 3

Fresh, raw, wastewater sewage, was passed first through a standard one-inch bar screen, and then through a fine mesh screen to remove most of the (settled and floating) solids. The solids were collected into a container. This procedure simulates the action of a static microscreen.

Subsequently, the following bench study was conducted:

To 4000 ml of this wastewater, 1.0 ml of the duo-quat/organo-tin preparation was added to give a concentration of 100 ppm. The materials contained in the preparation were BTC-215M Duo-Quat (97%) and PBTO (3%). the mixture was vigorously shaken for up to one minute to ensure uniform mixing.

Approximately one liter of this solution was placed in a blender and mixed at a low speed for 1 minute intervals every other minute during a 30 minute period. (This intermittent mixing method simulates conditions obtained in a plant with surface aerators.)

The blended sample was then filtered through a Buchner funnel containing rapid filter sand into a sterile flask. This procedure simulates the gravity filter action.

An aliquot of this last filtrate and an aliquot of the filtrate obtained after passing the sewage through the bar and fine mesh screens, were analyzed for fecal coliform, total coliform and relative stability (using methylene blue) in accordance with ASTM AWWA-APHA-WPCF (14th Edition). The results are shown below:

TREATED WASTEWATER:
  FECAL COLIFORM
    1:100 dilution —1/100 ml
    1:4 dilution —1/100 ml
    1:1 dilution —1/100 ml
  TOTAL COLIFORM
    1:100 dilution —1/100 ml
    1:4 dilution —1/100 ml
    1:1 dilution —1/100 ml
  RELATIVE STABILITY: The sample remained blue for a period of 23 days at 68° F. which indicated a relative stability of 99%.

UNTREATED WASTEWATER:
  FECAL COLIFORM 1:10,000 dilution; 2,580,000/100 ml
  TOTAL COLIFORM 1:10,000 dilution; TNTC
  RELATIVE STABILITY: The sample turned clear in 0.5 days at 68° F. which indicated a relative stability of 11.0%.

These results indicate that the wastewater treated in accordance with the present invention is bacteriologically sterile with a contact time of 30 minutes. In addition, the characteristic raw sewage odor disappeared almost immediately upon contact with the formulation and the sample was relatively clear in appearance.

It will be appreciated that although the foregoing is useful for domestic wastewater treatment (i.e. treatment of waste-water produced in residential areas, or in industrial areas by workers, shower facilities and cafeterias), it can also be used to treat other kinds of wastewater such as process and/or cooling wastewater provided that such wastewater contains biodegradable organic matter and bacteria. It can also be used in conjunction with other wastewater treatment methods. Thus, even if the process water to which the present process is applied contains contaminants other than bacteria, these contaminants can be removed prior to, or preferably after, the present treatment by techniques appropriate for the types of contaminants that are to be removed.

TABLE I

| TANK NAME | CONVENTIONAL | | | PRESENT INVENTION | | |
|---|---|---|---|---|---|---|
| | CAPACITY (gal.) | VOLUME (ft³) | RET. (hrs) | CAPACITY (gal.) | VOLUME (ft³) | RET. (hrs) |
| AERATION | 30,000 | 4011 | 24.0 | 2,500 | 334 | 2.0 |
| SETTLING | 6,500 | 870 | 5.2 | 1,200 | 160 | 1.0 |
| FILTRATION | (standard 2 gpm per sq. ft.) | | | (standard 2 gpm per sq. ft.) | | |
| CL2 CONTACT | 3,200 | 428 | 2.6 | — | — | — |
| B.W. HOLDING | 2,000 | 267 | — | 2,000 | 267 | — |
| DIGESTER | 8,000 | 1070 | — | — | — | — |
| TOTALS: | 49,7000 gal | 6646 ft³ | 31.8 | 5,700 gal | 761 ft³ | 3.0 hrs. |

What is claimed is:

1. A method for treating domestic wastewater containing biodegradable organic material and microorganisms, said method comprising as an alternative to treatment with activated sludge:

mixing into said wastewater a disinfectant/bactericidal compositign comprising compounds selected from the group consisting of quarternary organic ammonium halides or mixtures thereof and an organotin compound in an amount and for a period of time sufficient to disinfect/sterilize said wastewater, said composition having a ratio of quaternary ammonium halide to organotin of at least about 99 to 1;

aerating said sterilized wastewater for a time sufficient to lower or satisfy its biochemical oxygen demand;

allowing solid particles contained in said wastewater to settle or float;

removing said particles from said wastewater; and passing said wastewater through filtering means to clarify it from colloidal impurities.

2. The method of claim 1 wherein the organotin compound is selected from the group consisting of tri-n-butyltin oxide, ethyltin tridchloride, diethyltin dichloride, triethyltin chloride, tetraethyltin, trimethyltin acetate, triethyltin acetate, tri-n-propyltin acetate, tri-n-butyltin acetate, tri-n-hexyltin acetate, triphenyltin acetate, triethyltin hydroxide, triethyltin benzoate, triethyltin acetate, triethyltin cyanide, triethyltin phenoxide, and triethyltin toluene-p-sulphonamide.

3. The method of claim 2 wherein the quaternary ammonium halide compounds are selected from the group consisting of n-alkyl dimethyl benzyl ammonium chloride, cetyl trimethylammonium bromide, cetyl pyridinium bromide, cetyl pyridinium chloride, tetradecylpyridinium bromide, alkyldimethylbenzyl-ammonium chloride, B-Phenoxyethyldimethyldodecylammonium bromide, Di(n-octyl)dimethylammonium bromide, p-tert-octylphenoxyethoxyethyldimethyl-benzylammonium chloride, N-(acylcolaminoformylmethyl)-pyridinium chloride, and mixtures thereof.

4. The method of claim 3 wherein said aeration time is from about 2 to 3 hours.

5. The method of claim 4 further comprising physically separating coarse solid materials contained in said wastewater prior to mixing said composition in said wastewater.

6. The method of claim 5 further comprising disposing of:
(a) the physically separated solid materials;
(b) the floated or settled particles; and
(c) the filtered wastewater.

7. The method of claim 3 further comprising settling solid particles in a settling means, cleaning the filtering means using a portion of said filtrate as backwash cleaning fluid and reintroducing said fluid in the settling means.

8. The method of claim 3 wherein said composition comprises a mixture of at least two alkyl dimethyl benzyl ammonium chlorides, and tri-n-butyl-tin and propylene glycol as a carrier.

9. The method of claim 3, wherein said amount of said composition ranges between 50 and 100 ppm of said wastewater.

10. The method of claim 9, wherein said amount is 100 ppm.

11. The method of claim 4, wherein said filtered wastewater is for spray irrigation directly after said treatment.

12. method of claim 5, wherein said aeration takes place in an aeration tank having a capacity substantially equal to that the hourly throughput of said wastewater multiplied by aeration time.

* * * * *